Patented May 15, 1951

2,553,470

UNITED STATES PATENT OFFICE 2,553,470

PRODUCTION OF ALKENYL PHENOLS

Herman Pines, Chicago, and Jerome A. Vesely, Evanston, Ill., assignors to Universal Oil Products Company, Chicago, Ill., a corporation of Delaware No Drawing. Application October 4, 1947, Serial No. 778,034

7 Claims. (Cl. 260—624)

This invention relates to the catalytic interaction of a phenol with a diene. It is more particularly concerned with the production of alkenyl phenols containing a substitutable hydrogen atom attached to the ring with an alkadiene, in which only one of the double bonds is attached to a tertiary carbon atom, in the presence of an alkenylation catalyst comprising a Friedel-Crafts metal halide and a compound selected from the group consisting of alcohols and ethers.

We have found that phenols and certain substituted phenols such as alkylphenols can be converted into valuable unsaturated derivatives thereof by reaction with polyolefinic hydrocarbons in the presence of certain modified Friedel-Crafts metal halide catalysts. These derivatives are useful as intermediates in the preparation of plastics, elastomers, resins, germicides, medicinals, and the like.

In one embodiment our invention relates to a process which comprises reacting a phenolic compound having a substitutable hydrogen atom attached to the ring with a diene at condensation conditions in the presence of a condensation catalyst comprising a Friedel-Crafts metal halide and a compound selected from the group consisting of alcohols and ethers.

In a more specific embodiment our invention relates to an alkenylation process which comprises reacting a phenolic compound having a substitutable hydrogen atom attached to the ring with an alkadiene, in which only one of the double bonds is attached to a tertiary carbon atom, at alkenylation conditions in the presence of an alkenylation catalyst comprising a Friedel-Crafts metal halide and a compound selected from the group consisting of alcohols and ethers.

Phenolic compounds that may be reacted with dienes in accordance with our invention must contain at least one substitutable nuclear hydrogen atom, i. e., a hydrogen atom that is attached to the ring and that is capable of being replaced by an alkenyl or a cycloalkenyl group. Examples of such compounds are phenol; cresol; polyhydric phenols such as hydroquinone and catechol; alkoxyphenols such as guaiacol, para-methoxy phenol, and para-ethoxy phenol, in which the number of carbon atoms in the alkyl group is small; naphthol; and the like.

The compounds with which phenols are reacted in our process comprise dienes, preferably dienes in which only one of the double bonds is attached to a tertiary carbon atom. When diolefins of the latter type are contacted with phenols containing a substitutable hydrogen atom attached to the ring in the presence of a modified Friedel-Crafts condensation catalyst of the type herein described at relatively mild reaction conditions, condensation between the diene and the phenol is effected at the more reactive double bond attached to the tertiary carbon atom. The less reactive nontertiary double bond does not undergo reaction and, as a result, a phenol with an unsaturated hydrocarbon substituent is produced. If both double bonds of the diene are tertiary or nontertiary, each possesses the same order of reactivity, and it is difficult to react one double bond and not the other. Hence, in general, alkenyl phenols can be obtained in significant yields only when the diene contains one tertiary double bond and one nontertiary double bond. Examples of such dienes, which may be either of the open chain or closed chain variety, i. e., alkadienes or cycloalkadienes, are isoprene, 2-methyl-1,3-pentadiene, 3-methyl-1,3-cyclohexadiene, and 2-methyl-1,4-pentadiene. Certain other dienes, such as 6-methyl-1,4-heptadiene, that isomerize to dienes having a tertiary and a nontertiary double bond at the alkenylation conditions employed, also may be used in our process.

The catalysts that may be used in this process comprise a Friedel-Crafts metal halide and an alcohol or an ether. The lower molecular weight alcohols and ethers such as methanol, ethanol, propanol, dimethyl ether, diethyl ether, methylethyl ether, and dioxan are preferred, although those of higher molecular weight occasionally can be used to advantage. The presence of the alcohol or ether in the catalyst composition modifies the activity of the metal halide in such a way that it promotes alkenylation of phenolic compounds with dienes containing a tertiary and a nontertiary double bond, i. e., it brings about condensation at the tertiary double bond without concomitant condensation at the nontertiary double bond. In contrast, the use of unmodified metal halides in the reaction between phenols and dienes results in the formation of highly condensed compounds and little or no alkenyl phenols. The metal halides used in our catalyst composition may be any of the Friedel-Crafts type such as aluminum chloride, aluminum bromide, stannic chloride, zinc chloride, and the like.

The catalyst complex or composition is most conveniently prepared by cooling a quantity of alcohol or ether and then slowly adding thereto the desired quantity of the metal halide. The resultant material may be either a fluid or a solid depending upon the compounds used and their relative proportions. When ethers are used, the complex usually is a fluid.

The process of our invention may be carried out in batch operation by placing a quantity of the catalyst in a reactor equipped with a stirring device, adding the phenol, heating or cooling to the desired reaction temperature, slowly adding the diene while mixing the contents of the reactor, and recovering the product. The preferred method of operation is of the continuous type. If the catalyst is a liquid, the catalyst and reactants may be continuously charged to a reaction zone wherein intimate contacting is effected. The effluent from the reaction zone is passed to a settler wherein a separation is effected between the phenol-hydrocarbon and catalyst phases. At least a portion of the catalyst phase may be recycled to the reactor and the phenol-hydrocarbon phase may be continuously processed for recovery of the desired products. If the catalyst is a solid it may be disposed as a bed within a reactor and the reactant continuously passed through it at reaction conditions.

The process of this invention may be conducted at temperatures within the range of from about $-10°$ C. to about $100°$ C. and preferably between $0°$ C. and about $75°$ C. At temperatures below $-10°$ C. very little reaction takes place; at temperatures above $100°$ C. the nontertiary double bond as well as the tertiary double bond tends to enter into the reaction with a resultant decrease in the yield of alkenyl phenol.

Our process should be conducted in the liquid phase, hence the pressure should be such that substantially all of the reactants are in liquid phase at the reaction temperature employed.

The contact time is not particularly critical. It may be from about several minutes to several hours.

A molecular excess of the phenol over the diene in the reaction zone is desirable because it favors condensation of the phenol with the diene and tends to suppress polymerization.

The following examples are given to illustrate our invention but they are not intended to unduly limit the generally broad scope of said invention. The experiments shown in the examples were made by charging a phenol and catalyst to an alkylating flask provided with a stirrer, thermometer, dropping funnel and a dry ice reflux condenser. The flask was placed in a hot water bath or an ice bath depending on the temperature at which the reaction was to be conducted. When the operating temperature was reached, isoprene was slowly added to the flask while the contents thereof were stirred. After the diene addition had been completed, the stirring was continued for an additional hour. Thereafter, the product was transferred to a separatory funnel and placed in an ice bath until the catalyst layer settled out. The organic layer was recovered and washed with water several times to remove residual catalyst, and then washed with excess 30% potassium hydroxide to dissolve the phenolic compounds. The alkali insoluble product was extracted with ether and the ether extract was washed with water, and dried over potassium carbonate and distilled. The alkali soluble product was acidified with dilute hydrochloric acid and extracted with ether. The ether extract was treated several times with water, then with sodium bicarbonate solution, then with water, and finally it was dried over anhydrous sodium sulfate and distilled.

*Examples I and II*

Phenol was pentenylated with isoprene using a stannic chloride-ethanol complex as the catalyst. The operating conditions and results are shown in the following table. For comparative purposes a similar experiment is shown in which unmodified stannic chloride was used as the catalyst.

| Example No. | I | II |
|---|---|---|
| Catalyst: | | |
| Kind | $SnCl_4$ | $SnCl_4$-EtOH [1] |
| Amount, gms | 22.6 | 25.2 |
| Isoprene, gms | 47 | 47 |
| Temperature, °C | 17 | 17 |
| Time, hrs | 18-24 | 12 |
| Yield, Mol. Per Cent based on Isoprene Chgd.: | 2.5 | 2.7 |
| Pentenylphenols | | 25 |
| Chromans and Coumarans | | 20 |

[1] 14.2 gms. $SnCl_4$ and 11.0 gms. EtOH (about 1M:5M).

The stannic chloride caused the formation of high boiling alkali soluble compounds that probably contained two or more phenolic groups per mol. The alkali insoluble product comprised mainly a nontacky clear amber resin. In contrast thereto, the product obtained when using the stannic chloride-ethanol complex as the catalyst contained a relatively large percentage of pentenylphenol and a somewhat smaller portion of chromans and coumarans.

We claim as our invention:

1. A process for the production of an alkenyl phenol which comprises reacting a phenol having a substitutable hydrogen atom attached to the ring with an alkadiene having at least one tertiary carbon atom and in which only one of the double bonds is attached to a tertiary carbon atom, at a temperature of from about $-10°$ C. to about $100°$ C. and in the presence of a complex of stannic chloride with a compound selected from the group consisting of lower molecular weight saturated aliphatic mono-alcohols and lower molecular weight saturated aliphatic mono-ethers and cyclic diethers.

2. A process for the production of an alkenyl phenol which comprises reacting a phenol having a substitutable hydrogen atom attached to the ring with isoprene at a temperature of from about $0°$ C. to about $75°$ C. and in the presence of a complex of stannic chloride with ethanol.

3. The process of claim 1 further characterized in that said phenol is the compound phenol.

4. The process of claim 1 further characterized in that said phenol is a cresol.

5. The process of claim 1 further characterized in that said phenol is a polyhydric phenol.

6. The process of claim 1 further characterized in that said phenol is hydroquinone.

7. The process of claim 1 further characterized in that said phenol is an alkoxyphenol selected from the group consisting of guaiacol, paramethoxy phenol and para-ethoxy phenol.

HERMAN PINES.
JEROME A. VESELY.

REFERENCES CITED

The following references are of record in the file of this patent:

UNITED STATES PATENTS

| Number | Name | Date |
|---|---|---|
| 2,283,465 | Schaad | May 19, 1942 |
| 2,332,555 | Buc | Oct. 26, 1943 |
| 2,406,639 | Schmerling et al. | Aug. 27, 1946 |
| 2,442,878 | Schmerling et al. | June 8, 1948 |